United States Patent
Kumar et al.

(10) Patent No.: US 10,728,348 B2
(45) Date of Patent: Jul. 28, 2020

(54) SYSTEMS AND METHODS FOR ANALYZING APPLICATION USAGE ON A USER DEVICE

(71) Applicant: AirWatch, LLC, Atlanta, GA (US)

(72) Inventors: Bhavesh Krishna Kumar, Atlanta, GA (US); Abhishek Mishra, Atlanta, GA (US); Nigitha Alugubelli, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 138 days.

(21) Appl. No.: 15/174,760

(22) Filed: Jun. 6, 2016

(65) Prior Publication Data
US 2017/0353565 A1    Dec. 7, 2017

(51) Int. Cl.
*G06F 15/173* (2006.01)
*H04L 29/08* (2006.01)
*H04L 29/06* (2006.01)

(52) U.S. Cl.
CPC .............. *H04L 67/22* (2013.01); *H04L 67/02* (2013.01); *H04L 67/10* (2013.01); *H04L 67/125* (2013.01); *H04L 67/36* (2013.01); *H04L 67/42* (2013.01)

(58) Field of Classification Search
CPC ..... G06Q 10/0833; H04L 41/22; H04L 67/22; H04L 67/36; H04L 43/045; H04L 43/08; H04L 67/10
See application file for complete search history.

(56) References Cited

U.S. PATENT DOCUMENTS

| | | | |
|---|---|---|---|
| 2005/0004879 A1* | 1/2005 | Mathias | G06F 11/3423 705/400 |
| 2008/0300967 A1* | 12/2008 | Buckley | G06Q 30/02 705/7.34 |
| 2011/0173525 A1* | 7/2011 | Mukhopadhyay | G06F 11/3409 715/212 |
| 2012/0144384 A1* | 6/2012 | Baek | G06F 11/3013 709/224 |
| 2012/0166619 A1* | 6/2012 | Mefford, Jr. | G06F 21/10 709/224 |
| 2015/0143456 A1* | 5/2015 | Raleigh | H04W 12/08 726/1 |
| 2015/0347725 A1* | 12/2015 | Ben Ari | G06F 21/31 726/19 |
| 2016/0274902 A1* | 9/2016 | Mehrotra | G06F 8/70 |
| 2017/0078922 A1* | 3/2017 | Raleigh et al. | H04W 28/10 |

* cited by examiner

Primary Examiner — Suraj M Joshi
Assistant Examiner — Ayele F Woldemariam
(74) Attorney, Agent, or Firm — Clayton, McKay & Bailey, PC

(57) ABSTRACT

Systems and methods are provided for analyzing application usage on a user device and optimizing application and license distribution for user devices in an enterprise. An example system includes a management server and a data server. The management server can provide instructions to the user device to install a tracking application that gathers application-usage data using built-in functionality of the user device. The data server can receive and compile the application-usage data, creating compiled usage data. Using this compiled usage data, the management server can execute a rules engine to determine an action to take associated with at least one application on the user device, such as redistributing application licenses.

17 Claims, 5 Drawing Sheets

SYSTEMS AND METHODS FOR ANALYZING APPLICATION USAGE ON A USER DEVICE

BACKGROUND

Enterprises frequently overspend on software applications for their workforces. Enterprise applications continue to increase in popularity, showing a steep increase in development in recent years. Enterprises expend substantial capital—sometimes millions of dollars—to develop, license, or purchase these applications. Despite their expenditures, these enterprises typically lack any meaningful information regarding an application's usage. This lack of information leads to various inefficiencies, such as purchasing licenses to use the application for employees that never actually use the application. For large-scale enterprises, these inefficiencies multiply as more applications are developed or purchased over time.

A core source of inefficiency is the lack of data regarding application usage. Usage metrics for publicly available applications are often only available to the developer. The enterprise might be forced to pay a third-party for this information. Metrics for internal and web-based applications can be even more difficult to ascertain. Internal applications are typically distributed through an Enterprise Mobility Management ("EMM") system, while web-based applications provide an application-based gateway to a website, but both types of application fail to provide meaningful metrics. Without these metrics, an enterprise lacks the tools to optimize their application deployment to employees.

Third-party solutions offer a potential option for an enterprise that desires application metrics for an internal application. However, these solutions carry various drawbacks. For example, they require additional coding within each application, increasing the complexity and development time for applications. Another substantial drawback is the cost of utilizing a third-party solution for every application as it is developed. If these third-party solutions differ between applications within an enterprise, then the enterprise might receive data in varying formats. Finally, the third-party solutions fail to provide optimization strategies across multiple applications, leaving the enterprise with lots of data but no actionable strategy for optimization.

As a result, a need exists for a system that can analyze application usage—including internal-application and web-application usage—on a user device, as well as determine optimization strategies to save money for the enterprise.

SUMMARY

Examples described herein include systems and methods for analyzing application usage on a user device. In one example, a system is provided that includes a management server and a data server. The management server can communicate with a user device that is enrolled with the management server. If the user device is enrolled and compliant with any relevant compliance rules, the management server can provide instructions to the user device to install a tracking application on the user device. The tracking application gathers application-usage data using a native Application Program Interface ("API") on the user device.

The application-usage data can then be transmitted from the user device to the data server. The data server can create compiled usage data, such as by aggregating the application-usage data based on time periods, user groups, user devices, or other categories for grouping information. Using this compiled usage data, the management server can determine an action to take associated with at least one application on the user device. To make this determination, the management server can execute a rules engine that uses the compiled usage data. The rules engine can perform a variety of optimization determinations based on optimization rules applied to the compiled usage data. For example, the rules engine can perform an optimization determination for distributing licenses to multiple user devices.

The action carried out by the rules engine can be accomplished automatically, without any human input, or can include strategic human input. In some examples, the action carried out by the rules engine includes prompting an administrator, through an administrator console, to authorize a redistribution of application or license privileges for at least one user. The optimization rules themselves can be created, modified, or deleted by an administrator by using the administrator console.

In some examples, the system can also include an identity server that monitors login requests for certain applications on the user device. For example, the identity server can monitor login requests for a first application, installed on the user device, and a second application, accessed on the Internet by the user device. The identity server can provide login data associated with the login requests to the data server. The data server, in turn, can utilize the login data when compiling data. In some examples, the compiled usage data from the data server is based, at least in part, on the login data received from the identity server.

The system can also include a graphics engine, either running on the management server or as a standalone implementation. The graphics engine can generate a graphical representation based on the compiled usage data created by the data server, and display the graphical representation on a graphical user interface ("GUI"). For example, the graphics engine can display a graphical representation on the GUI associated with an administrator console, such that the administrator can quickly and easily understand application and license usage across various groups of user devices.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for analyzing application usage on a user device and optimizing application and license distribution for user devices in an enterprise. An example system includes a management server and a data server. The management server can provide instructions to an enrolled user device to install a tracking application that gathers application-usage data using built-in functionality of the user device. The data server can receive and compile the application-usage data, creating compiled usage data. In some examples, the data server can also receive login data from an identity server that handles login requests for various applications. The data server can use the login data, as well as the application-usage data, to create compiled usage data. Using this compiled usage data, the management server can execute a rules engine to determine an action to take associated with at least one application on the user device, such as redistributing application licenses.

Figure 1:
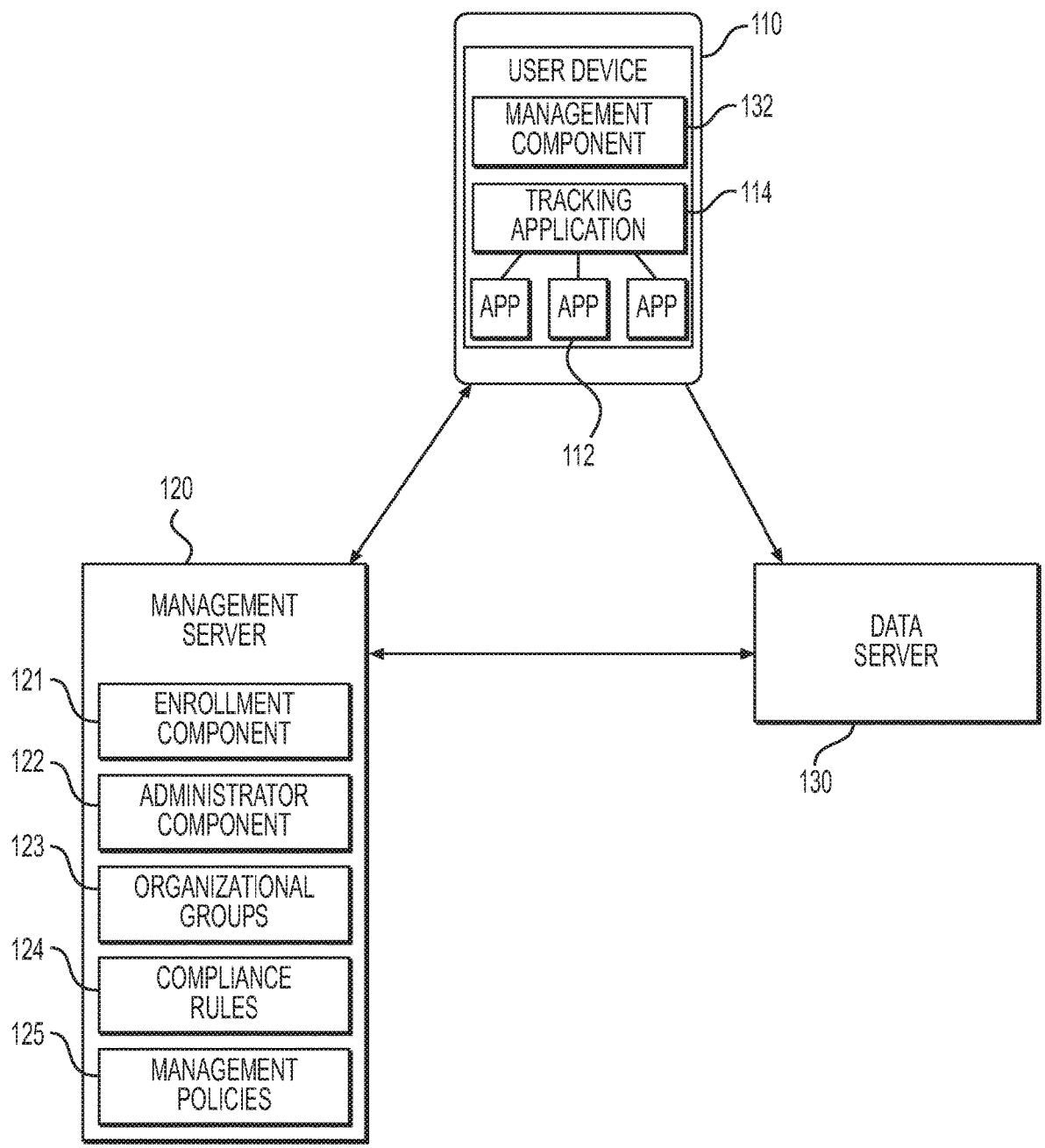
FIG. 1 is an exemplary illustration of system components for analyzing application usage on a user device.
Figure 2:
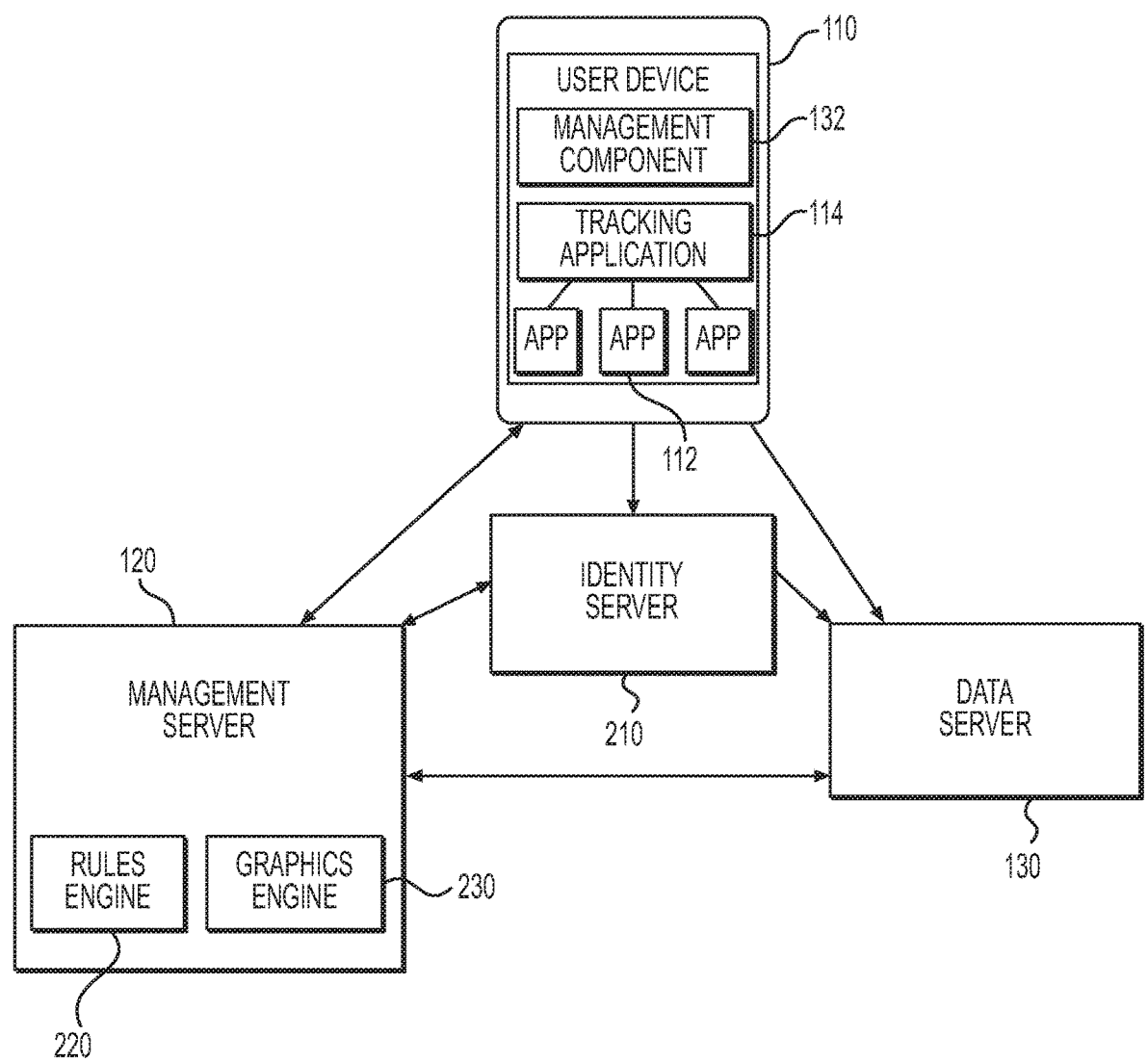
FIG. 2 is another exemplary illustration of system components for analyzing application usage on a user device.
Figure 3:
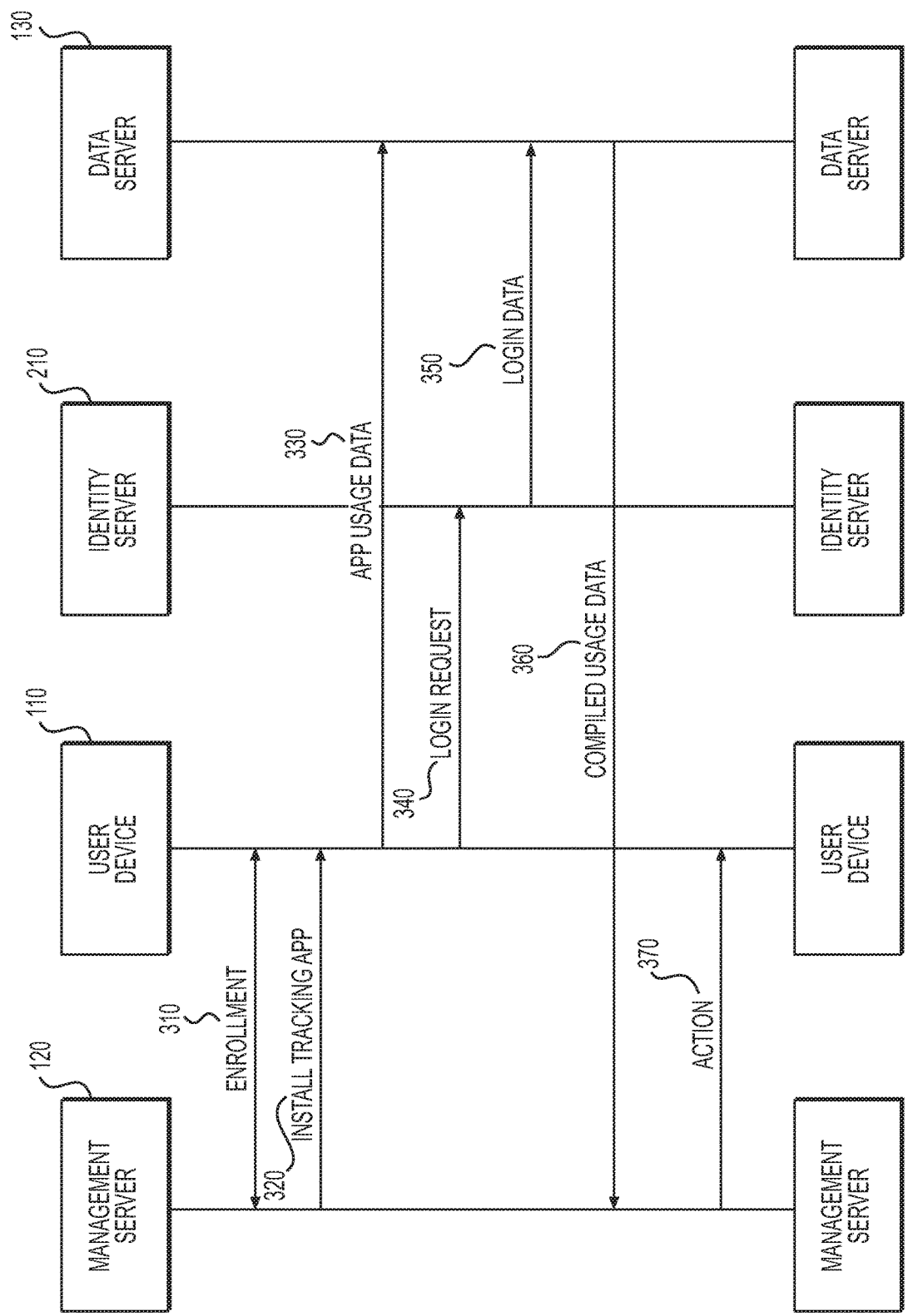
FIG. 3 is an exemplary method of analyzing application usage on a user device.
Figure 4:
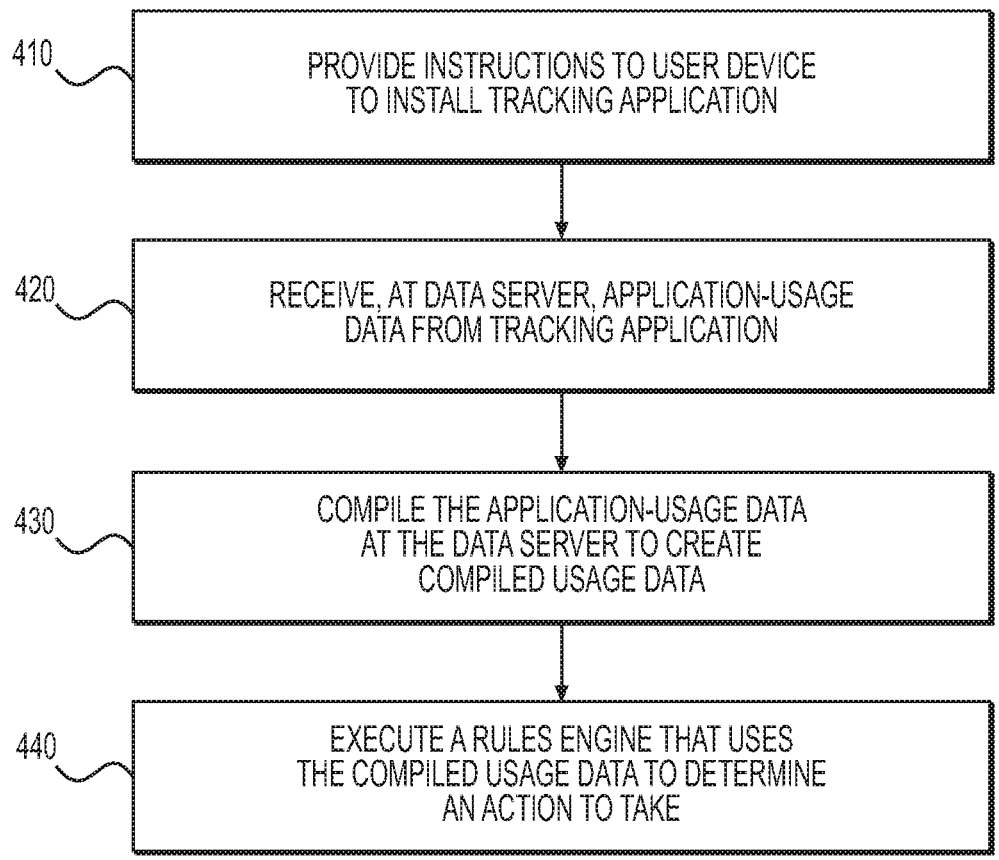
FIG. 4 is a flowchart of an exemplary method of analyzing application usage on a user device.
Figure 5:
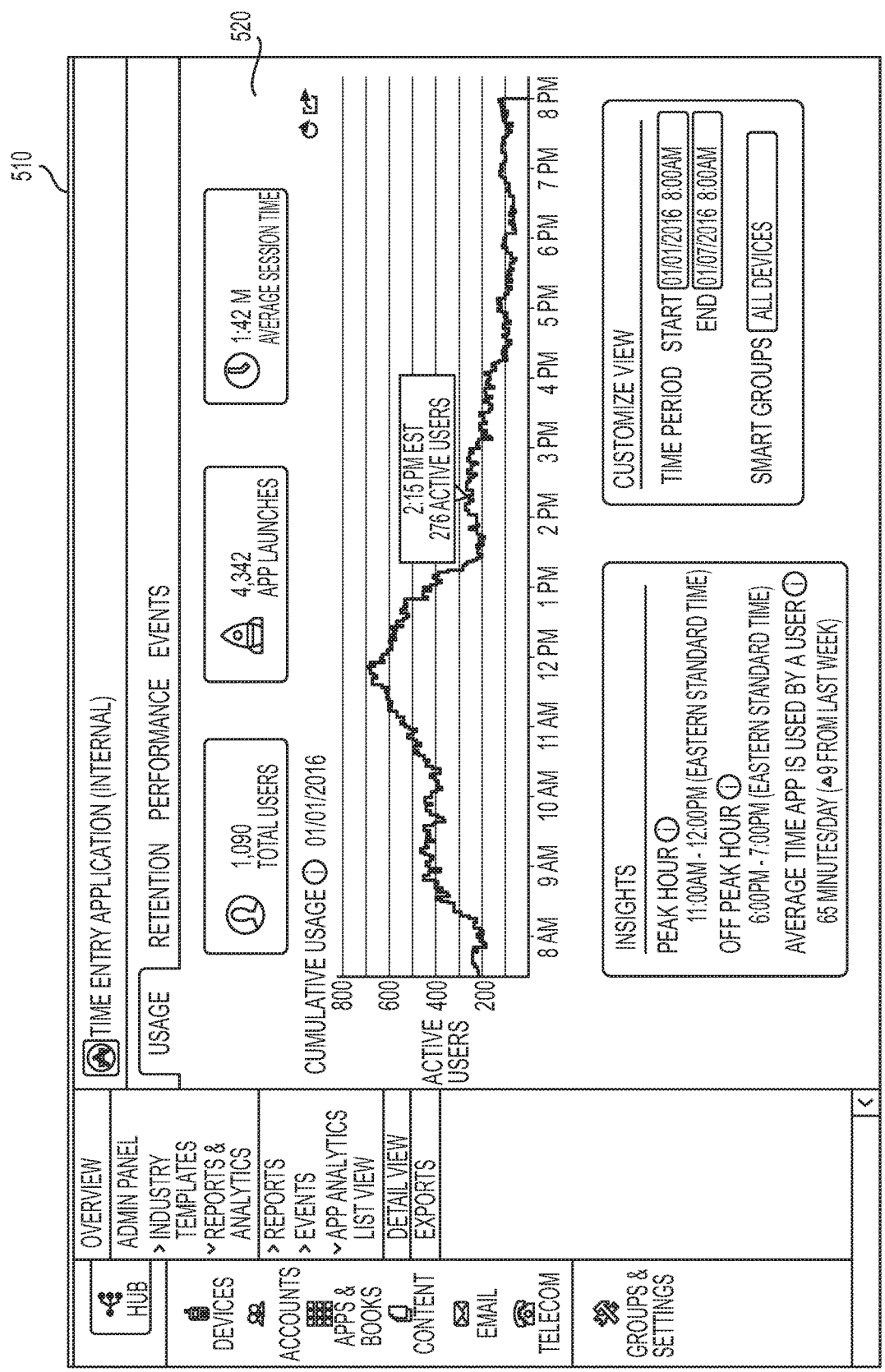
FIG. 5 is an example console having a graphical user interface for visualizing application usage on enterprise user devices.

FIG. 1 provides an illustration and accompanying description of an example system for analyzing application usage on a user device, along with system components for device enrollment and compliance monitoring. FIG. 2 provides a more detailed example of a system for analyzing application usage on a user device, including using an identity server to gather information associated with login requests from the user device. FIGS. 3 and 4 provide example methods that can encompass a system or method for analyzing application usage on a user device, including those in FIGS. 1 and 2. Finally, FIG. 5 illustrates an example console and GUI for visualizing application-usage data across multiple user devices in an enterprise.

Turning to FIG. 1, an illustration of an example system is shown for analyzing application usage on a user device 110. A user device 110 can include any computing device, such as a cell phone, laptop, tablet, personal computer, or workstation. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device" and "user devices" are used interchangeably, as appropriate.

The user device 110 can enroll with a management server 120—for example, as part of an overall EMM or Mobile Device Management ("MDM") system. The MDM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein.

A system administrator can have privileges associated with managing, editing, revising, and otherwise administrating functions associated with the management server 120. The management server 120 can monitor and manage the operation of user devices 110, through the management server 120 itself, or more specifically, through a management service or program executing on the management server 120. Although one user device 110 is shown, the management server 120 can monitor and manage the operation of multiple user devices 110 enrolled in a device management service. The management server 120 can also provide access to email, calendar data, contact information, and other enterprise resources to enrolled user devices 110.

The management server 120 can include components for enrolling the user device 110 and confirming compliance. These features will be discussed in more detail below. After establishing enrollment and compliance, the management server 120 can cause a tracking application 114 to be installed on the user device 110. The user device 110 can have multiple additional applications 112 installed as well, either by the management server 120 or from independent operation of the user device 110. Although three applications 112 are shown, the systems and methods described herein are not limited to any particular number of applications.

The tracking application 114 can gather application-usage data with respect to the applications 112 installed on the user device 110. In one example, the tracking application 114 gathers application-usage data by accessing a native API on the user device 110. For example, an ANDRIOD operating system running on a user device 110 can include a native API that includes various hooks or access points, through which the tracking application 114 can gather data. The tracking application 112 can also use a management component 132 (described in more detail below) to access the native API. The tracking application 112 or management component 132 can make requests to the operating system regarding application usage.

The tracking application 114 can gather any type of data provided by the API of the user device 110. For example, application-usage data can include information regarding which applications 112 have been installed on the user device 110, the date and time of each access of an application 112 by the user, the duration of each usage of an application 112, device hardware (such as a camera) used in conjunction with an application 112, the location of the user device 110 while accessing an application 112, data usage associated with accessing an application 112. These types of application-usage data are merely examples; any type of data made available by a native API can be considered application-usage data. Moreover, any type of data associated with an application 112 can be considered application-usage data.

The tracking application 114 can provide gathered application-usage data to the data server 130. The application-usage data can be raw data collected by the tracking application 114 without any further analysis or processing. In some examples, the tracking application 114 can provide basic processing or organizing of the data to assist the data server 130. However, in most cases the tracking application 114 will transmit the application-usage data with minimal additional processing. This allows the tracking application 114 to operate without using substantial system resources of the user device 110. In some examples, the tracking application 114 can be instructed to store the application-usage data on the user device 110 until the user device 110 is connected to WIFI, plugged into a device charger, or both. In this way, the tracking application 114 can transmit data in a manner that puts the least stress on the resources of the user device 110.

In some examples, the data server 130 is a network of servers, some of which can be located remotely from one another. In another example, the data server 130 is a single server with multiple purposes. In yet another example, the data server 130 is a server (or group of servers) dedicated to the operations described herein. In one example, the data server 130 is the same server, or group of servers, as the management server 120. In practice, the data server 130 can be a standalone server due to the high demand for analytic processing.

The data server 130 can receive the application-usage data from the tracking application 114 and compile it. In this context, the term "compile" can refer to any type of analyzing, organizing, summarizing, or otherwise altering data. In some examples, compiling includes organizing the data according to the user device 110, user, time period, organizational group 123, or application 112. For example, the data server 130 can compile a spreadsheet that lists the amount of time each user accessed a particular application 112 over a two-week period. In another example, the data server 130 can compile a spreadsheet that lists the number of times that the users of each organizational group 123 accessed a particular application 112 in a day.

In some examples, the data server 130 can receive requests from the management server 120 for a specific set of data. For example, an administrator can request, through the management server 120, compiled data regarding usage of a particular application 112 by a single user. In response to such a request, the data server 130 can access either the application-usage data or the compiled usage data and compile a dataset having only the requested information. In another example, the data server 130 can provide—and update—compiled usage data in response to a standing request from the management server 120. For example, the management server 120 can request continuing data regarding the overall usage of an application 112. In response, the data server 130 can provide updates, either continuously or at certain time intervals, with compiled usage data regarding usage of that application 112. The management server 120 can utilize the compiled usage data in a number of ways, as described in more detail with respect to FIG. 2.

As mentioned above, the management server 120 can include components for enrolling the user device 110 and confirming compliance. With respect to enrollment, the management server 120 can include an enrollment component 121 and an administrator component 122, either or both of which can be used for the process of enrolling a user device 110. For example, the user device 110 can communicate with the enrollment component 121 during the initial stages of enrollment. In some examples, the enrollment component 121 can provide a token to the user device 110 indicating that the user device 110 has been authenticated and is permitted to communicate and enroll with the management server 120. The management server 120 or enrollment component 121 can provide the user device 110 with information regarding how to access and communicate with the administrator component 122 in order to continue the enrollment process.

In some examples, the administrator component 122 can request a token from the user device 110, indicating that the user device 110 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 110 and the enrollment process. In some examples, the administrator component 122 can be dedicated to a particular enterprise or group of enterprises, while the enrollment component 121 can be shared across multiple different enterprises.

As part of the enrollment process, the management server 120 can cause a management component 132 to be installed on the user device 110. The management component 132 can be a portion of an operating system for the user device 110, or it can operate in the application layer of the user device 110. For example, the management component 132 can be a dedicated application or other software installed on the user device 110 that can monitor and manage data, software components, and hardware components associated with the user device 110. The management component 132 can monitor and control functionality and other managed applications on the user device 110.

The management component 132 can be an application, or portion of an application, that provides functionality beyond simply monitoring and managing resources in the user device 110. In one example, a developer can use a software development kit (SDK) to insert, for example, security libraries into the application that can communicate with the management component 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management component 132 executing in a user device 110. For example, if a security library provides the ability to monitor and enable or disable functionality provided by an application, the management component 132 can call functions provided by the library to monitor and enable or disable the functionality.

In addition to the enrollment component 121 and administrator component 112 described above, the management server 120 can include one or more organizational groups 123. An organizational group 123 can include data representing a group of user devices 110 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

As well as corresponding to a business team, an organizational group 123 can correspond to user devices 110 positioned in a particular geographic location. For example, a business can have different business locations, such as a public waiting room, private conference room, a laboratory, office space, and a parking garage. In this example, separate organizational groups 123 can be established for each of the public waiting room, private conference room, laboratory, office space, and parking garage. User devices 110 positioned in one of these locations can be included in the respective organizational group 123.

The management server 120 can also include compliance rules 124. A compliance rule 124 can set forth one or more conditions that must be satisfied in order for a user device 110 to be deemed compliant. If compliance is broken, the management server 120 can take steps to control access of the user device 110 to enterprise files, applications, and email. Compliance rules can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 110 is compliant can be made by the management server 120, the user device 110, or a combination of both. For example, the management component 132 on the user device 110 can generate a data object that describes the state of the user device 110, including any settings, parameters, applications, or other information regarding the state of the user device 110. The data object can be analyzed by the management server 120 or the user device 110 to determine whether the user device 110 is in compliance with compliance rules 124. In the case of the user device 110 analyzing compliance, a management component 132 installed on the user device 110 can make the comparison between the data object and compliance rules 124.

In some examples, a compliance rule 124 can specify one or more triggering conditions. If a triggering conditions occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions.

Example compliance rules 124 can include: (1) an Application List rule specifying that a particular application 112 is contained or not contained on a user device 110, that required applications 112 are installed on the user device 110, or that no blacklisted or non-whitelisted applications 112 are installed on the user device 110; (2) a Cell Data Usage rule specifying that a user device 110 not exceed a threshold amount of data usage; (3) a Cell Message Usage rule specifying that a user device 110 not exceed a threshold amount of message usage; (4) a Cell Voice Usage rule specifying that a user device 110 not exceed a threshold amount of voice data usage; (5) a Compromised Status rule specifying that a user device 110 not be compromised, such as by having a modified operating system; (6) a Device Last Seen rule specifying that a user device 110 be recognized by the management server 120 within a certain period of time; (7) a Device Manufacturer rule specifying that a user device 110 be made by a certain manufacturer or group of manufacturers; (8) an Encryption rule specifying that a user device 110 be encrypted; (9) an Interactive Certificate Profile Expiry rule specifying that a user device's 110 certificate expire (or not expire) within a certain timeframe; (10) a Last Compromised Scan rule specifying that a user device 110 not have a compromised scan within a certain timeframe; (11) an MDM Terms of Use Acceptance rule specifying that a user device 110 have accepted the MDM Terms of Use, or have accepted the terms within a certain timeframe; (12) a Model rule specifying that a user device 110 is (or is not) a particular device model; (13) an OS Version rule specifying that a user device 110 have a particular operation system version or something newer or older than that version; (14) a Passcode rule specifying that a passcode is present for a user device 110; (15) a Roaming rule specifying that a user device 110 is roaming; (16) a Roaming Cell Data Usage rule specifying that a user device 110 not exceed a threshold amount of roaming data usage; and (17) a SIM Card Change rule specifying that a user device 110 have (or not have) a changed SIM card. These compliance rules 124 are merely exemplary and can be fashioned in the alternative to the manner described above. Other compliance rules 124 may be used as well.

The management server 120 can take one or more remedial actions in response to a compliance rule 124 being broken. In one example, a remedial action includes blocking or removing an application 112 from a user device 110. In another example, a remedial action includes performing an enterprise wipe (deleting all enterprise-related applications 112 and data from a user device 110) or an enterprise reset (reloading all enterprise-related applications 112 and associated data). In some examples, a remedial action includes blocking email access for a user device 110. A remedial action can also include sending an email, SMS, or push notification to a user, or sending an email to an administrator. In some examples, a remedial action can include blocking or removing a particular profile, a certain type of profile, or all profiles. The remedial action can also include installing a new profile on a user device 110. These remedial actions are merely exemplary, and other remedial actions can be taken as well. In addition, the remedial actions can be staged such that a user is provided a chance to fix their compliance issue before suffering a harsher consequence.

As an example, a user can break a compliance rule 124 by installing a blacklisted application 112 on their user device 110. The management server 120 can detect the blacklisted application 112 by, for example, examining a device record for the user device 110 that includes an application list. In response to finding the blacklisted application 112 on the application list, the management server 120 can notify the user that their user device 110 is noncompliant, and optionally provide a timeframe indicating when further remedial action will be taken. If the application 112 is not removed within that timeframe, the management server 120 can perform an enterprise wipe of the user device 110, uninstalling the management component 132 and any enterprise-related applications or other information from the user device 110. Similarly, a compliance rule 124 can be used to enforce application 112 usage; for example, a compliance rule 124 can specify that if an application 112 is not used a threshold number of times, or a threshold amount of time, within a particular time period, then the application 112 is deleted from the user device 110.

A management policy 125 can specify that a user device 110 has permission to perform or access certain functionality. For example, the user device 110 can be restricted to certain enterprise repositories and functions within applications. In one example, the management policy 125 applies to an organizational group 123, with which the user device 110 can be associated. The organizational group 123 can change over time and include different user devices 110 over time. But because the management policy 125 is associated with the organizational group 123 rather than the any particular user device 110, the management policy 125 can apply to all user devices 110 within the organizational group 123 at any given time.

In one example, the user device 110 can become a member of, or become associated with, an organizational group 123 when an administrator specifies that the user device 110 should be a member. In another example, the user device 110 becomes associated with an organizational group 123 when a membership condition is satisfied, such as through a dynamic evaluation of the membership condition. A membership condition can be created by an administrator 110 by specifying a condition relating to the user device 110 that, when satisfied, causes the user device 110 to be associated with the organizational group 123. Similarly, the membership condition can be created such that when a condition relating to the user device 110 is met (or not met), the user device 110 is removed from the organizational group 123.

Alternatively, a user device 110 can become disassociated with an organizational group 123 based on the user of the user device 110. For example, an administrator 110 or dynamic evaluation can identify an individual for additional to, or removal from, an organizational group 123. If the user operates multiple user devices 110, all of the user's user devices 110 can be added to, or removed from, the organizational group 123 of interest. In this way, all of the user's user devices 110 can be made subject to a uniform set of management policies 125 and compliance rules 124.

As part of the enrollment or management of a user device 110, an administrator 110 can create a device record for the user device 110. The device record can be stored on the management server 120, and can include data related to the management of the user device 110. For example, the device record can include data describing one or more of: the identity and type of the user device 110; components of the user device 110; the state of the user device 110; organizational groups 123 to which the user device 110 belongs; compliance rules 124 with which the user device 110 must comply; and management policies 125 that specify if, when, and how the user device 110 is permitted to function.

For example, data describing the identity and type of the user device 110, as well as the components of the user device 110, can include at least one or more of: a unique identifier associated with the user device 110; a device type of the user device 110 (e.g., a smartphone, a tablet computing, a laptop computer, a desktop computer, a server computer, or a virtualized instance of any of such computer types); and various software and hardware components of the user device 110 (e.g., operating system (or kernel or bios) type and version, processor type and speed, memory type and size, network interface types, various I/O component types such as camera, touchscreen, keyboard, mouse, printer).

The device record can also include data describing the state of the user device 110 can include, for instance, various settings that are applied to the user device 110. The data can also specify various applications that are installed on or being executed by the user device 110, and various files that are installed on or are accessible to the user device 110. Additionally, the data describing the state of the user device 110 can specify information related to the management of the user device 110, such as the last time the user device 110 provided data describing its state to the management server 120. The data can also describe whether the user device 110 is in a state of compliance with any applicable compliance rules 124, and whether any remedial actions have been (or are to be) taken as a result of a noncompliance with any applicable compliance rules 124.

The data describing organizational groups 123 to which the user device 110 belongs can, for example, include any organizational groups 123 of which the user device 110 is a member, either by virtue of a hard-coded relationship between the user device 110 and the organizational group 123, or by virtue of a dynamic evaluation of a membership condition associated with the organizational group 123.

The data describing compliance rules 124 with which the user device 110 must comply can, for instance, specify one or more remedial actions that should be performed in the event that an associated rule condition occurs. Data describing management policies 125 can include permissions of the user device 110, such as access rights, and settings that are being enforced upon the user device 110. In some examples, the data describing compliance rules 124 and the data describing management policies 125 can be obtained from an organizational record associated with an organizational group 123 to which the user device 110 is a member.

In some examples, an administrator 110 can manually input data into the administrator component 122 in order to generate a device record for a user device 110. In other examples, the administrator component 122 can obtain a data object, such as an electronic spreadsheet, extensible markup language (XML) file, or comma separated values (CSV) file. The administrator component 122 can extract information describing the user device 110 from the data object to create a corresponding device record. The device record for each user device 110 can include information identifying each user device 110 and its respective device record.

In some examples, after the administrator component 122 creates a device record for a user device 110, the management server 120 can detect whether the user device 110 is enrolled. For example, the management server 120 can determine whether a flag is set, indicating that the user device 110 is enrolled.

If the user device 110 is not yet enrolled, the management server 120 can automatically transmit information identifying the user device 110 to the enrollment component 121. For example, the user device 110 can transmit a device identifier, such as its media access control (MAC) address, to the enrollment component 121. In some examples, when the enrollment component 121 receives the device identifier, the enrollment component 121 can determine whether a corresponding device record exists. If there is no corresponding device record, the enrollment component 121 can determine that the user device 110 is not authorized to enroll.

FIG. 2 shows an example system for analyzing application 112 usage on a user device 110. Similar to the system of FIG. 1, the system of FIG. 2 includes a user device 110 in communication with a management server 120 and a data server 130. The user device 110 includes a tracking application 114 that collects application-usage data for one or more applications 112 installed on the user device 110. The system of FIG. 2 can include all of the functionality described with respect to FIG. 1. However, the system of FIG. 2 includes additional functionality, as described below.

FIG. 2 includes an identity server 210. In some examples, the identity server 210 is a network of servers, some of which can be located remotely from one another. In another example, the identity server 210 is a single server with multiple purposes. In yet another example, the identity server 210 is a server (or group of servers) dedicated to the operations described herein. In one example, the identity server 210 is the same server, or group of servers, as the management server 120. The identity server 210 can be a third-party server, such as a third-party identity provider, or can be an EMM server managed by the management server 120. In another example, the management server 120 and identity server 210 can be part of the same server.

The identity server 210 can authenticate the user at both web-based and internal applications 112 accessed by the user device 110. A web-based application can be accessed on the Internet, such as a website. One type of example web-based application is a software as a service ("SaaS") application that runs in the cloud. An internal application can be a managed application or other application installed on the user device 110. The identity server 210 can provide an authentication method for both types of applications 112 that does not require a manual login each time the application 112 is accessed. Because the identity server 210 can act as an authentication gateway, it can also collect data regarding the user's application usage and report that data to the data server 130.

In one example, a user device 110 can register with the identity server 210. Registration can be accomplished by first requesting an identity token from the identity server 210. This request can be made by attempting to access an application 112, such as a web-based application 112. The identity server 210 can authenticate the user in any suitable way, such as by requesting login credentials, requesting a certificate from the user device 110, or requesting an identifier from the user device 110 that can be confirmed at the management server 120. Once the identity server 210 has authenticated the user, it can send a token, such as a Security Assertion Markup Language ("SAML") token, to the user device 110 to be used for logging into a web-based application 112. From there, the user device 110 can log in to a web-based application 112 by sending the token to the website, which can then authenticate the user based on that token.

In one example, the management server 120 sets the user device 110 to authenticate at the identity server 210. During enrollment, the management server 120 can supply an address of the identity server 210 through the management component 132. Managed enterprise applications 112 can specify an active profile that causes the user device 110 to contact the identity server 210 when the application 112 is accessed by the user. The identity server 210 can be used to authenticate the user for both web-based and internal applications 112.

When the user device 110 contacts the identity server 210, the identity server 210 checks with the management server 120 to verify that the user is active and compliant within the system. If the user is in good standing, then the identity server 210 issues a SAML token to the user device 110 for presenting to the application 112 for authentication purposes. The token can describe the user. The token can also describe what organizational group 123 the user belongs to, or other rights specified by the management server 120. This information can be described in XML or another language. The identity server 210 can be configured by the management server 120 to only provide the necessary user information specific to each application 112 that the user attempts to access.

The user device 110 can authenticate at the web-based application 112 by sending the SAML token to a web server associated with a web-based application 112. The web server can be a cloud server, for example. In one example, the user device 110 automatically contacts the identity server 210 based on the user selecting an application or web link associated with the web-based application 112. In that instance, the identity server 210 then sends a message to the web-based application 112 including the SAML token. The web server can recognize the identity server 210 as a trusted source of the user's identity.

Alternatively, the user can go directly to the web-based application 112 prior to contacting the identity server 210. For example, the user can follow a bookmark link to a web-based application 112. The web-based application 112 can determine that the user device 110 is contacting the web server from within an enterprise associated with the identity server 210. One way the web server can make this determination is through use of domain discovery. The domain can be associated with the identity server 210 by the web server or by a service in communication with the web server. The web server can then redirect the user's request for access to the identity server 210. The identity server 210 can verify the identity of the user or user device 110 and issue a SAML token to the user device 110 for providing to the web server. The SAML token can include transport information that specifies a forwarding address where the web server will receive the SAML token.

The identity server 210 can also set the SAML token to have a limited lifetime, such that the user device 110 must continue to authenticate at the identity server 210 for each different web application 112 the user attempts to access. The lifetime can be set to a time frame, such as five minutes, in one example. In another example, the token can be limited for use with only a particular application 112. Setting the lifetime in this way can also ensure that an employee cannot continue to access web applications 112 without revalidating at the identity server 210. Instead, each time the user accesses an application 112, the identity server 210 can verify that the user is still a compliant and valid user. When the management server 120 removes the user from the identity server 210, such as when the user leaves the enterprise or becomes non-compliant, the user can then no longer authenticate at the web application 112 or internal application 112.

Because the identity server 210 can authenticate the user each time a user opens a web-based application 112 or internal application 112, the identity server 210 can also reliably collect data regarding the user's activity at those applications 112. In particular, the identity server 210 can monitor login requests for the application 112, collecting data regarding the date and time of a login, as well as the particular application 112 to which the user device 110 is logging in. The identity server 210 can then provide this login data associated with the login requests to the data server 130.

The data server 130 can compile the login data, either by adding it to the application-usage data and analyzing the combined data store, or by compiling the application-usage data and login data separately. In either case, the compiled usage data that gets sent to the management server 120 can be based on both the application-usage data and the login data.

The management server 120 can execute a rules engine 220 that uses the compiled usage data to determine an action to take associated with at least one application 112 on the user device 110. The rules engine 220 can determine actions that range from fully automated to requiring administrator input or approval. The rules engine 220 itself can be managed by an administrator, such that the rules executed by the rules engine 220 can be created, deleted, or modified by the administrator.

The rules engine 220 can allow an enterprise to redistribute licensed applications based on application usage. For example, an administrator can establish a rule that if a user device 110 does not access a licensed application 112 within a 30-day period, the licensed application 112 is automatically removed from the user device 110. As another example, an administrator can establish a rule that if a user device 110 accesses a licensed application 112 less than two times during a two-week period, the management server 120 can prompt the administrator, through an administrator portal, regarding whether the user device 110 is allowed to maintain the application 112 on the device. In yet another example, an administrator can establish a rule that every user within a particular organizational group 124 will be prompted to install a particular application 112 when usage by the group or a related group collectively meets a usage threshold, such as usage frequency, usage time, or number of uses. If a user moves in or out of that organizational group 124, access to that application 112 can be automatically granted or revoked, as appropriate.

The rules engine 220 can perform an optimization determination for distributing or redistributing licenses for an application 112. The rules engine 220 can apply optimization rules to the compiled usage data received from the data server 130. Those optimization rules can be created, deleted, or modified by an administrator. For example, an optimization rule can specify that if a user accesses a graphics application 112, such as PHOTOSHOP, more than twice a week for four consecutive weeks, then the user will also be granted access to one or more additional graphics applications 112. Instead of directly granting access to the additional application 112, the optimization rule can prompt an administrator to provide that access.

In some examples, multiple optimization rules can be applied to the compiled usage data in order to make a single decision. For example, a first optimization rule can specify that if a user is associated with a particular organizational group 124, that user is granted access to a particular application 112. However, a second optimization rule can specify that if the user does not access that application 112 often enough—for example, once a week—then access to the application can be revoked.

Optimization rules run by the rules engine 220 can be applied to large numbers of user devices 110 at one time. For example, an optimization rule can specify that once a week, or once a month, the rules engine 220 determines the 5% of user devices 110 that have access to an application 112 but utilize the application 112 less often than the other 95% of user devices 110. The rules engine 220 can then cause a message to be sent to those 5% of user devices 110, prompting them to opt to remove the application 112 from their user device 110. In another example, access can be automatically revoked for those 5% of user devices 110. In yet another example, access can be revoked for those 5% of user devices 110 and transferred to other user devices 110 that lack such access. In that example, the rules engine can cause the management server 120 to query the user devices 110 that lack access and ask the user to confirm that he or she would like access.

FIG. 2 also includes a graphics engine 230 that can be executed by the management server 120. To allow a user or administrator to understand application usage within an enterprise, the graphics engine 230 can generate graphical representations based on the compiled usage data received from the data server 130. In some examples, the graphics engine 230 generates information regarding a graphical representation to be displayed on a GUI. The graphics engine 230 can cause the graphical representation to be displayed on an administrator console or on a user device 110. The graphics engine 230 can also generate graphical representations that accompany a prompt or question sent to an administrator or a user. For example, if the rules engine 220 determines that use of a particular application 112 has dwindled over time for a user, the rules engine 220 can cause a prompt to be sent to the user, informing them that their access to the application 112 has been revoked. As part of the prompt, the rules engine 230 can generate a graphical representation of the declining use of the application 112 over time.

FIG. 3 provides an example method for analyzing application 112 usage on a user device 110, using the components described in FIGS. 1 and 2. At stage 310, the user device 110 is enrolled with the management server 120. This process can include a token exchange or other form of authentication. The enrollment and administrator components 121, 122 of the management server 120 can communicate with the user device 110 and assist with the enrollment process. A management component 132 can be installed on the user device 110 during enrollment. Although stage 310 describes enrollment, it can also include compliance. The user device 110 must comply with certain compliance rules 124 in order to maintain access to managed applications 112 and web-based applications 112 requiring authentication at the identity server 210.

If the user device 110 is enrolled and compliant, the management server 120 can install a tracking application 114 at stage 320. For example, the management server 120 can provide instructions to the user device 110 to install the tracking application 114 on the user device 110. The instructions can include a command sent to the management component 132 installed on the user device. In some examples, a compliance rule 124 can be enforced that requires the user device 110 to execute the tracking application 114.

At stage 330, the user device 110 sends application-usage data 330 to the data server 130. The user device 110 can obtain the application-usage data 330 from the tracking application 114. For example, the tracking application 114 can gather application-usage data by accessing a native API on the user device 110. The tracking application 114 can then cause the application-usage data 330 to be communicated to the data server 130, via the Internet or a cellular data service, for example.

At stage 340, the user device 110 optionally sends a login request to the identity server 210. The login request can result, for example, from the user accessing a web-based application 112 installed on the user device 110. In one example, the login request from the user device 110 can be redirected by an application 112 to the identity server 210. The identity server 210 can authenticate the user on behalf of the web-based application 112 or other application 112 type. In some examples, the identity server 210 utilizes a SAML token to authenticate the user. Other types of authentication tokens are also possible.

The identity server 210 can monitor login requests for that application 112 and any others, including information such as the date and time of a login, or type of application being accessed. This information can be gathered by the identity server as login data. At stage 350, the login data is transmitted to the data server 130.

At stage 360, the data server 130 transmits compiled usage data to the management server 120. The compiled usage data can be based on the application-usage data received at stage 330, the login data received at staged 350, or a combination of both. The compiled usage data can be data that is analyzed, organized, summarized, or otherwise prepared by the data server 130 before sending the compiled usage data to the management server at stage 360.

At stage 370, the management server takes an action with respect to the user device 110. The action can include, for example, automatically providing or revoking access to an application 112 for one or more users, prompting an administrator to provide or revoke access to an application 112 for one or more users, and sending a reminder to a user device 110. Of course, other actions may be taken in addition to or instead of these example actions. The action can be determined by a rules engine 220, which uses the compiled usage data to perform any number of optimization determinations using optimization rules. Those optimization rules can be created, deleted, or modified by an administrator.

FIG. 4 provides a flowchart of an example method of analyzing application 112 usage. At stage 410, instructions are provided to a user device 110 to install a tracking application 114. The instructions can be provided from a management server 120 with which the user device 110 is currently enrolled. The management server 120 can confirm that the user device 110 is enrolled and compliant before providing instructions to the user device 110 to install the tracking application 114. In some examples, the management server 120 can require that the user device 110 install the tracking application 114 in order to remain compliant.

At stage 420, application-usage data is received at a data server 130. The application-usage data can be collected by the tracking application 114. The tracking application 114 can send the application-usage data to the data server 130, either continuously or periodically. In some examples, the tracking application 114 sends the application-usage data to the data server 130 once a day. In another example, the tracking application 114 sends new application-usage data to the data server 130 each time an application 112 is accessed.

At stage 430, the data server 130 compiles the application-usage data to create compiled usage data. The compiled usage data can be data that is analyzed, organized, summarized, or otherwise prepared by the data server 130. In some examples, compiling includes organizing the data according to the user device 110, user, time period, organizational group 123, or application 112. For example, the data server 130 can compile a spreadsheet that lists the amount of time each user accessed a particular application 112 over a two-week period. In another example, the data server 130 can compile a spreadsheet that lists the number of times that the users of each organizational group 123 accessed a particular application 112 in a day.

Stage 440 includes executing a rules engine that uses the compiled usage data to determine an action to take. The rules engine can be executed by a management server 120 or on a standalone server or device. The rules engine 220 can determine actions that range from fully automated to requiring administrator input or approval. For example, the rules engine 220 can determine that a managed application 112 should be removed from a user device 110, if, based on the compiled usage data, the rules engine 220 determines that the user device 110 has not accessed the managed application in a certain period of time. Alternatively, the rules engine 220 can redistribute software licenses amongst users if certain users are not using an application 112 often enough to justify spending resources on the license for those users. The new recipients of the licenses can be determined by usage statistics for similar applications 112. Alternatively, new recipients can be assigned to users with a user group that collectively uses the application 112 or similar application 112 above a threshold activity level. An administrator can establish, remove, or modify the rules that are executed by the rules engine.

FIG. 5 provides an illustration of an example console 510 that can be accessed by an administrator. The console 510 includes a GUI 520 for displaying various types of information. An administrator can use the console 510 to view statistics regarding various applications 112, authorize license redistributions, and perform other management activities. The console 510 can be executed on the management server 120 or merely be in communication with the management server 120. For example, an administrator can use the console 510 to provide a user with access to a particular application 112. By selecting the appropriate option on the console 510, the administrator can cause the console 510 to communicate with the management server 120, and cause the management server 120 to take appropriate action. For example, the management server 120 can allow access to an application 112 through the management component 132 installed on the user device 110.

As discussed with respect to FIG. 2, the management server 120 can execute a graphics engine 230. The graphics engine 230 can generate graphical representations based on the compiled usage data received from the data server 130. In some examples, the graphics engine 230 generates information relating to a graphical representation to be displayed on the GUI 120. Although the GUI 120 is shown as part of a console 510, the GUI 120 can be a standalone implementation that does not require a console 510. However, integration with a console 510 can allow an administrator to efficiently view graphical representations of compiled usage data on the GUI 520 and then act on that data through use of the console 510.

In the example of FIG. 5, the GUI 520 depicts a "Usage" tab that shows the cumulative usage of an internal Time Entry Application 112. The Usage tab includes a graphical representation of cumulative usage across a particular time period. This tab also includes helpful information culled from the compiled usage data, such as the peak hour of usage, the off-peak hour of usage, and the average time an application 112 is used by a user. The GUI 520 can include additional tabs, such as "Retention," "Performance," and "Events." These additional tabs can be tailored to display different types of information on the GUI 520. For example, the Retention tab can show graphical information representing the proportion of users that accessed an application 112 at certain time intervals after downloading the application 112. The Performance tab can show graphical information representing the overall utilization of an application across different users or organizational groups 124. The Events tab can provide a graphical representation of information organized in terms of defined events, such as a new application 112 release or a redistribution of application 112 licenses. These implementations are merely exemplary. The console 510 and GUI 520 can be tailored to provide any representation of the compiled usage data provided by the data server 130.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for analyzing application usage on a user device, comprising:
    a management server, having a processor and a memory store, that provides instructions
        to the user device to install a tracking application on the user device, wherein the tracking application gathers application-usage data using a native Application Program Interface (API) on the user device; and
    a data server, having a processor and a memory store, that receives the application-usage data from the tracking application and compiles the application-usage data to create compiled usage data,
    wherein the management server executes a rules engine that uses the compiled usage data to determine an action to take associated with at least one application accessed from the user device,
    wherein the rules engine performs an optimization determination for distributing licenses to multiple user devices based on optimization rules applied to the compiled usage data,
    wherein at least one of the optimization rules an amount of access of the at least one application by the user device to:
        a threshold amount of time within a time period,
        a threshold number of times within a time period, and a threshold activity level based on respective amounts of access of the at least one application by the multiple user devices, and wherein the optimization determination includes determining that access to the at least one application should be revoked based on the optimization rules being applied to the compiled usage data.

2. The system of claim 1, further comprising an identity server that monitors login requests for a first application, installed on the user device, and a second application, accessed on the Internet by the user device, wherein the identity server provides login data associated with the login requests to the data server.

3. The system of claim 2, wherein the compiled usage data is based, at least in part, on the login data provided by the identity server.

4. The system of claim 1, wherein the action carried out by the rules engine comprises prompting an administrator, through an administrator console, to authorize a redistribution of application or license privileges for at least one user.

5. The system of claim 1, wherein the optimization rules can be created, modified, or deleted through an administrator console.

6. The system of claim 1, further comprising a graphics engine that generates a graphical representation based on the compiled usage data and displays the graphical representation on a graphical user interface (GUI).

7. A non-transitory, computer-readable medium containing instructions that, when executed by a processor, performs stages for analyzing application usage on a user device, the stages comprising:

providing instructions, from a management server to the user device, to install a tracking application on the user device, wherein the tracking application gathers application-usage data using a native API on the user device;

receiving, at a data server, the application-usage data from the tracking application;

compiling the application-usage data at the data server to create compiled usage data; and executing a rules engine that uses the compiled usage data to determine an action to take associated with at least one application accessed from the user device, wherein the rules engine performs an optimization determination for distributing licenses to multiple user devices based on optimization rules applied to the compiled usage data, wherein at least one of the optimization rules compares an amount of access of the at least one application by the user device to:

a threshold amount of time within a time period, a threshold number of times within a time period, and a threshold activity level based on respective amounts of access of the at least one application by the multiple user devices, and wherein the optimization determination includes determining that access to the at least one application should be revoked based on the optimization rules being applied to the compiled usage data.

8. The non-transitory, computer-readable medium of claim 7, the stages further comprising:

monitoring, at an identity server, login requests for a first application installed on the user device and a second application accessed on the Internet by the user device; and providing login data associated with the login requests to the data server.

9. The non-transitory, computer-readable medium of claim 8, wherein the compiled usage data is based, at least in part, on the login data provided by the identity server.

10. The non-transitory, computer-readable medium of claim 7, wherein the action carried out by the rules engine comprises prompting an administrator, through an administrator console, to authorize a redistribution of application or license privileges for at least one user.

11. The non-transitory, computer-readable medium of claim 7, wherein the optimization rules can be created, modified, or deleted through an administrator console.

12. The non-transitory, computer-readable medium of claim 7, the stages further comprising:

generating a graphical representation, by a graphics engine, based on the compiled usage data; and displaying the graphical representation on a GUI.

13. A method for analyzing application usage on a user device, comprising:

providing instructions, from a management server to the user device, to install a tracking application on the user device, wherein the tracking application gathers application-usage data using a native API on the user device;

receiving, at a data server, the application-usage data from the tracking application;

compiling the application-usage data at the data server to create compiled usage data; and executing a rules engine that uses the compiled usage data to determine an action to take associated with at least one application accessed from the user device, wherein the rules engine performs an optimization determination for distributing licenses to multiple user devices based on optimization rules applied to the compiled usage data, wherein at least one of the optimization rules compares an amount of access of the at least one application by the user device to:

a threshold amount of time within a time period, a threshold number of times within a time period, and a threshold activity level based on respective amounts of access of the at least one application by the multiple user devices, and wherein the optimization determination includes determining that access to the at least one application should be revoked based on the optimization rules being applied to the compiled usage data.

14. The method of claim 13, further comprising:

monitoring, at an identity server, login requests for a first application installed on the user device and a second application accessed on the Internet by the user device; and providing login data associated with the login requests to the data server.

15. The method of claim 13, wherein the action carried out by the rules engine comprises prompting an administrator, through an administrator console, to authorize a redistribution of application or license privileges for at least one user.

16. The method of claim 13, wherein the optimization rules can be created, modified, or deleted through an administrator console.

17. The method of claim 13, further comprising:

generating a graphical representation, by a graphics engine, based on the compiled usage data; and displaying the graphical representation on a GUI.

* * * * *